United States Patent [19]
Murayama et al.

[11] 3,846,401
[45] Nov. 5, 1974

[54] 3'-O,5'-N-CYCLOPHOSPHATE NUCLEOSIDES

[75] Inventors: Akira Murayama, Gottingen; Hans Hettler, Weil am Rhein; Bernd Jastorff, Rhumspringe, all of Germany

[73] Assignee: Max Planck-Gesellschaft zur Forderung Der Wissenschaften E.V., Munich, Germany

[22] Filed: July 1, 1971

[21] Appl. No.: 159,001

[30] Foreign Application Priority Data
July 1, 1970 Germany.............................. 2032436

[52] U.S. Cl............................ 260/211.5 R, 424/180
[51] Int. Cl. ........................ C07d 51/52, C07d 51/54
[58] Field of Search .............................. 260/211.5 R

[56] References Cited
UNITED STATES PATENTS
3,712,885  1/1973  Weimann et al............. 260/211.5 R Primary Examiner—Johnnie R. Brown
Attorney, Agent, or Firm—Millen, Raptes & White

[57] ABSTRACT

Cyclophosphates of the formula

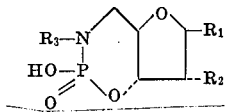

wherein $R_1$ is a pyrimidine or purine group; $R_2$ is H or OH, including those wherein the OH group is functionally modified; and $R_3$ is H or hydrocarbon containing one to 10 carbon atoms, including those bearing a substituent thereon; both in free base form and in the form of a physiologically acceptable salt thereof, have physiological activity which includes regulation of cardiac metabolism and circulation, carbohydrate and lipid metabolism, corticosteroid production and progesterone synthesis.

15 Claims, No Drawings

3'-O-5'-N-CYCLOPHOSPHATE NUCLEOSIDES

BACKGROUND OF THE INVENTION

This invention relates to novel cyclophosphates, to a process for their production and to uses thereof.

SUMMARY OF THE INVENTION

The compounds of this invention are cyclophosphates of the general Formula I

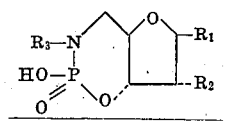

I wherein $R_1$ is a pyrimidine or purine group, attached by the ring nitrogen atom in position 1 or 9, respectively, thereof, $R_2$ is H or OH, including those wherein the OH group is functionally modified; and $R_3$ is H or hydrocarbon containing one to 10 carbon atoms, including those bearing a substituent thereon; both in free base form and in the form of a physiologically acceptable salt thereof.

These compounds possess useful physiological activity. They are regulators of cellular metabolism and transfer and/or modify hormonal effects on intracellular receptors. In particular, they influence cardiac metabolism and circulation and carbohydrate and lipid metabolism. They regulate corticosteroid production in the adrenal cortex and progesterone synthesis in the corpora lutea. Furthermore, they have diuretic and broncholytic activity and have a positive effect on electrolyte balance. They influence ion transfer through membranes, which is of special importance for cardiac and brain metabolism.

The novel compounds of Formula I can, accordingly, be employed as drugs and also are useful as intermediates for the production of other drugs.

The compounds of this invention also possess other useful properties. For example, the sodium salt of N-methyl-N-[5'-deoxy-adenyl-(3'-5')]-cyclophosphoric acid amide stimulates the germination of rice.

DETAILED DISCUSSION

The novel compounds of Formula I can be produced by the treatment of compounds of the general Formula II

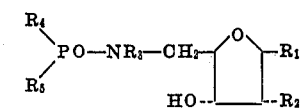

II wherein $R_1$, $R_2$ and $R_3$ have the values given above and $R_4$ and $R_5$ are aryloxy groups, with a base, optionally in the presence of water and/or at least one inert organic solvent.

In Formulae I and II, $R_1$ and the $CH_2$-group adjacent the nitrogen atom are positioned above the plane of the tetrahydrofuran ring and $R_2$ and the phosphoric acid ester group of Formula I and the OH-group of Formula II, respectively, are positioned beneath this plane. The configuration of the sugar thus corresponds to that of ribose or deoxyribose, respectively.

In the compounds of Formulae I and II, $R_1$ is a substituted or unsubstituted pyrimidine or purine ring structure attached by the ring nitrogen atom in position 1 or 9, respectively, thereof.

$R_1$ can be unsubstituted or the pyrimidine or purine ring can be substituted by one or more substituents, preferably those present on natural or synthetic nucleosides, e.g., halo, preferably chloro, bromo or fluoro, hydroxy, lower-alkyl, preferably methyl, primary, secondary or tertiary amino, e.g., $-NH_2$, $-NH$-lower-alkyl, $-N$(lower-alkyl)$_2$, hydroxymethyl.

$R_1$ of the compounds of Formulae I and II preferably is the radical of a natural nucleoside, especially adenine, guanine, thymine, xanthine, hypoxanthine, cytosine or uracil. Other such $R_1$ groups are 5-fluorouracil, 5-methylcytosine and 5-hydroxymethylcytosine, 5-hydroxymethylcytosine radicals.

$R_2$ is H or OH. When $R_2$ is a hydroxy group, it can be a free hydroxy group to be present in a functionally modified form, preferably an esterified or etherified form and more preferably as an acyloxy group of alkoxy group containing, respectively, up to eight carbon atoms.

Examples of compound of this invention wherein $R_2$ is an esterified hydroxy group, are those wherein the acid residue preferably is that of a saturated or unsaturated aliphatic, cycloaliphatic, aromatic, or heterocyclic, substituted or unsubstituted carboxylic acid or a sulfonic acid, each containing a total of one to 18 carbon atoms, inclusive. Preferred carboxylic acid residues are those of fatty acids of one to 18, preferably one to seven carbon atoms, e.g., formic acid, acetic acid, propionic acid, butyric acid, isobutyric acid, the valeric acids, e.g., n-valeric acid and trimethylacetic acid, the caproic acids, e.g., as n-caproic acid, tert.-butylacetic acid, or diethylacetic acid, the enanthic, caprylic, perlargonic, capric, and undecylic acids, e.g., the undecylenic acids, the lauric, myristic, palmitic, or stearic acids, e.g., oleic acid. Examples of other carboxylic acids are cyclopropyl-, cyclobutyl-, cyclopentyl-, and cyclohexylcarboxylic acid, cyclopropylacetic acid, cyclobutylacetic acid, the cyclopentyl-, cyclohexyl-, aryl-acetic acids and -propionic acids, e.g., phenylacetic acid, 3-phenylpropionic acid, 3-cyclopentylpropionic acid, or 3-cyclohexylpropionic acid, benzoic acid, p-nitrobenzoic acid, adamantane-1-carboxylic acid, phenoxyalkanoic acids, such as phenoxyacetic acid, halocarboxylic acids, e.g., chloroacetic acid, 2-chloropripionic acid, p-chlorophenoxyacetic acid, 2,4-dichlorophenoxyacetic acid, ether acids, e.g., 4-tert.-butyl-phenoxyacetic acid, 3-phenoxypropionic acid, 4-phenoxybutyric acid; heterocyclic acids, e.g., furan-2-carboxylic acid, 5-tert.-butyl-furan-2-carboxylic acid, 5-bromofuran-2-carboxylic acid, picolinic acid, nicotinic acid or isonicotinic acid, $\beta$-ketocarboxylic acids, e.g., acetoacetic acid, propionylacetic acid, butyrylacetic acid, and capronoylacetic acid.

Preferred sulfonic acid esters are esters of alkylsulfonic acids of one to six carbon atoms, inclusive, e.g., methanesulfonic acid and ethanesulfonic acid, and of arylsulfonic acids of six to 10 carbon atoms, inclusive, e.g., benzene-, p-toluene-, and 1-, and 2-naphthalene-sulfonic acid.

Examples of compounds of this invention wherein $R_2$ is an etherified OH-group include those wherein the ether group is preferably alkoxy of one to 12, more preferably of one to six carbon atoms, e.g., methoxy, ethoxy, propoxy, isopropoxy, n-butoxy, isobutoxy, sec.-butoxy and tert.-butoxy, also amyloxy, isoamyloxy, n-heptyloxy, n-hexyloxy, n-octyloxy, n-decyloxy, n-dodecyloxy; or cycloalkoxy, preferably of three to 12, especially five to six carbon atoms, e.g., cyclopropyloxy, cyclobutyloxy, cyclopentyloxy, cyclohexyloxy, cycloheptyloxy and cyclooctyloxy; alkenyloxy and alkynyloxy of preferably up to 12, especially up to four, carbon atoms, e.g., vinyloxy, allyloxy, propargyloxy, and butenyloxy; aryloxy containing one to three separate or fused rings and preferably six to 12 ring carbon atoms, e.g., phenoxy, o-, m-, or p-tolyloxy and 1- and 2-naphthyloxy; and aralkoxy containing one to three separate or fused rings and preferably seven to 12 carbon atoms, e.g., benzyloxy, p-methylbenzyloxy, 1- and 2-phenylethoxy, and 1- or 2-naphthylmethoxy; the corresponding alkoxy, alkenyloxy, alkynyloxy, aryloxy and aralkoxy groups of which being mono- or poly-substituted, preferably by hydroxy, or by lower alkoxy of one to four carbon atoms, e.g., methoxy, ethoxy, and n-butoxy; or by halogen, e.g., F, Cl, Br, or I; by amino; by substituted amino; e.g., monoalkylamino or dialkylamino wherein the alkyl groups preferably contain one to four carbon atoms; by heterocyclic residues, e.g., pyrrolidino, piperidino, homopiperidino, morpholino, thiomorpholino, N-alkylpiperazino wherein the alkyl group preferably contains one to four carbon atoms, N-phenylpiperazino, N-(hydroxyalkyl)-piperazino, e.g., N-($\beta$-hydroxyethyl)-piperazino, by mercapto, by alkylmercapto, e.g., of one to four carbon atoms; or by nitro.

Examples of preferred acyloxy groups are formyloxy, acetoxy, propionyloxy, butyryloxy, isobutyryloxy and benzoyloxy. Examples of preferred alkoxy groups are methoxy, ethoxy, propoxy, isopropoxy, butoxy, n-pentyloxy, n-hexyloxy, n-heptyloxy and n-octyloxy.

In the compounds of Formulae I and II, $R_3$ can be any hydrocarbon group of up to ten carbon atoms, including alkyl, e.g., containing one to 12 carbon atoms, especially alkyl of one to four carbon atoms, aryl, especially monocyclic or separate or fused bicyclic containing six to 12 carbon atoms, cycloalkyl, e.g., containing three to 12 and preferably containing five to seven carbon atoms, arylalkyl, wherein aryl and alkyl are as defined herein, or cycloalkylalkyl cycloalkyl and alkyl are as defined herein. $R_3$ can be an unsubstituted hydrocarbon group or a hydrocarbon group substituted with a simple substituent, e.g., hydroxy, alkoxy of preferably one to four carbon atoms, amino, mercapto, alkylmercapto of preferably one to four carbon atoms, carboxy, carb-lower-alkoxy, wherein the alkoxy group is preferably of one to four carbon atoms, guanidino, 3-indolyl, 4-imidazolyl.

Preferred such substituents are hydroxy, primary amino, carboxy and carb-lower-alkoxy.

Specific examples of $R_3$ are alkyl, e.g., methyl, ethyl, n-propyl, isopropyl, n-butyl, isobutyl, sec.-butyl, tert.-butyl, n-pentyl, n-hexyl, n-heptyl, n-octyl, n-nonyl and n-decyl; cycloalkyl, e.g., cyclopropyl, cyclobutyl, cyclopentyl, cyclohexyl, 4-methylcyclohexyl, cycloheptyl and cyclooctyl; aryl, e.g., phenyl, o-, m-, or p-tolyl and 1- or 2-naphthyl; aralkyl, e.g., benzyl, 1- and 2-phenylethyl; cycloalkylalkyl, e.g., cyclohexylmethyl and 1- or 2-cyclohexylethyl; hydroxyalkyl, e.g., 2-hydroxyethyl, 3-hydroxypropyl and 4-hydroxybutyl; aminoalkyl, e.g., 2-aminoethyl, 3-aminopropyl, 4-aminobutyl, 5-aminopentyl and 6-aminohexyl; carboxyalkyl, particularly carboxyalkyl which, with the N-atom of the phosphoric acid amide group, are derived from a naturally occurring aminoacid, e.g., from glycine (carboxymethyl), alanine (1-carboxyethyl), valine (1-carboxy-2-methylpropyl), leucine (1-carboxy-3-methylbutyl), isoleucine (1-carboxy-2-methylbutyl), phenylalanine (1-carboxy-2-phenylethyl), tyrosine [1-carboxy-2-(p-hydroxyphenyl)-ethyl], serine (1-carboxy-2-hydroxyethyl), threonine (1-carboxy-2-hydroxypropyl), cysteine(1-carboxy-2-mercaptoethyl), methionine (1-carboxy-3-methylmercaptopropyl), tryptophan [1-carboxy-2-(indolyl-3)-ethyl], aspartic acid (1,2-dicarboxyethyl), glutamic acid (1,3-dicarboxypropyl), arginine (1-carboxy-4-guanidinobutyl), lysine (1-carboxy-5-aminopentyl), histidine [1-carboxy-2-(imidazoly-4)-ethyl]; and carbalkoxyalkyl, e.g., carb-lower-alkoxy-alkyl, particularly carbomethoxyalkyl and carbethoxyalkyl groups and especially carbalkoxyalkyl groups corresponding to the above-named carboxyalkyl groups.

In the compounds of Formula II, $R_4$ and $R_5$ can be alike or different aryloxy groups containing, e.g., seven to 12 carbon atoms. Preferably, they are negatively substituted, more preferably identical, aryloxy groups, especially phenoxy substituted by at least one nitro and/or one cyano group, e.g., o-, m-, or p-nitrophenoxy, 2,4-dinitrophenoxy, 2-chloro-4-nitrophenoxy and o-, m-, or p-cyanophenoxy. Unsubstituted aryloxy groups, e.g., phenoxy, or haloaryloxy groups, e.g., o-, m- or p-chlorophenoxy, are also suitable, but are less advantageous.

In an especially preferred aspect, this invention relates to cyclophosphates (Ia) of Formula I wherein $R_1$ is an adenine, cytosine, guanine or thymine group, $R_2$ is H or OH and $R_3$ is H or lower-alkyl (one to four carbon atoms), including the physiologically acceptable salts of these compounds.

The compounds of Formula I can be in free base form or in the form of a physiologically acceptable salt. Preferred are alkali-metal salts, e.g., sodium, potassium and lithium, alkaline earth metal salts, e.g., calcium and barium. Others are magnesium or iron.

The ring system of the compounds of Formula I and the cyclization reaction which produces this ring system are novel. Although it is known that cyclic phosphoric acid esters otherwise corresponding to Formula I having an O-atom instead of the $R_3$—N group can be produced from nucleoside phosphoric acid p-nitrophenyl esters, i.e., compounds otherwise corresponding to Formula II having an O-atom instead of the $NR_3$ group and a cation instead of an $R_5$ group, the cyclization of a compound of Formula II to produce a compound of Formula I could not be predicted because of the differing structure relationships (P—N—C instead of P—O—C).

In the cyclization reaction, it is advantageous to block base-sensitive functional groups in the molecule of the starting compounds in a suitable manner, and then split off again any such required blocking groups in a conventional fashion, e.g., by hydrolysis or hydrogenolysis.

In its process aspect, this invention relates to a process for the preparation of cyclophosphates of Formula I wherein a compound of Formula II (wherein optionally any functional groups present in the residues $R_1$ and/or $R_3$ can be present in blocked form) is treated with a base. This treatment can be conducted in a stepwise manner and/or with the addition of water and/or of at least one inert organic solvent. Thereafter, any blocking groups optionally present in the thus-obtained products are removed, e.g., by treatment with hydrolytic or hydrogenating agents.

The starting compounds of Formula II can be obtained by reacting nucleoside-5'-tosylates of the general Formula III

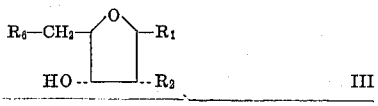

III wherein $R_6$ is a sulfonyloxy group, e.g., p-$CH_3C_6H_4SO_3$, with an amine of the formula $R_3NH_2$ wherein $R_3$ has the value given above, to produce the corresponding ammonium tosylates, from which the free bases of Formula III wherein $R_6 = R_3NH$ can be obtained with potassium tert.-butylate. These free bases are then phosphorylated with a phosphochloridate of the formula $R_4R_5POCl$ wherein $R_4$ and $R_5$ have the values given above, e.g., bis(p-nitrophenyl) phosphochloridate, to yield the compounds of Formula II.

For the cyclization of the compounds of Formula II to the cyclophosphates of Formula I, inorganic bases are preferred, particularly alkali metal or alkaline earth metal hydroxides, e.g., sodium hydroxide, potassium hydroxide, calcium hydroxide and barium hydroxide; and alkali metal carbonates, e.g., sodium and potassium carbonate. Alkali metal alcoholates, e.g., sodium or potassium methylate, sodium or potassium ethylate, sodium or potassium tert.-butylate, and ammonia are also suitable. Strong alkaline organic bases, e.g., quaternary bases, such as, for example, tetraethylammonium hydroxide and benzyltrimethylammonium hydroxide, can also be employed.

The cyclization is normally conducted in an aqueous medium. If desired, one or more inert, preferably miscible, organic solvents can be added to the aqueous solution. Examples of suitable solvents are alcohols, e.g., methanol, ethanol and isopropanol; ketones, e.g., acetone and butanone; amines, e.g., pyridine and triethylamine; amides, e.g., dimethylformamide; sulfoxides, e.g., dimethyl sulfoxide.

The cyclization is advantageously conducted at a temperature of between $-10°$ C. and $+70°$ C., preferably between $10°$ and $50°$ C. The reaction more quickly terminates at an elevated temperature. However, the stability of the cyclophosphates I decreases with increasing temperature. Therefore, yield is lowered. Reaction times normally range between 15 minutes and 14 days, preferably between 3 hours and 7 days, depending on the starting compound and the selected temperature.

The reaction conditions can be chosen so that there is obtained as the reaction product, a salt, preferably a physiologically acceptable salt, of the acidic cyclophosphate I with the base employed as the cyclizing agent, e.g., the sodium, potassium or barium salt. From this salt, the free acid of Formula I can be liberated in the conventional manner by gentle treatment with acid, e.g., a mineral acid. The free (acidic) cyclophosphates I are, however, not too stable. Therefore, it is more advantageous to employ the compounds of this invention in their more stable salt form, preferably the alkali metal salts and especially the sodium salt. Such salts can be converted into other physiologically acceptable salts by double reactions or with the aid of an ion exchanger.

Reaction conditions can also be employed whereby the intermediate products of the process can be isolated. For example, the compounds of Formula II can be treated stepwise, first with weaker bases and then with stronger bases. For example, by first treating a compound of Formula II wherein $R_3 = H$ with ammonia in aqueous pyridine, there is produced an intermediate compound otherwise corresponding to Formula II wherein $R_3 = H$ and $R_5 = OH$, which intermediate can then subsequently be cyclized with strong bases, e.g., potassium tert.-butylate to a compound of Formula I. It is possible to first produce as the reaction product a cyclophosphate which otherwise corresponds to Formula I wherein one of the $R_4$ and $R_5$ groups, e.g., p-nitrophenoxy, remains.

These intermediate compounds are obtained, for example, by conducting the cyclization under not too vigorous conditions with a weak base, e.g., ammonia. Thus, a compound of Formula II can be treated, for example, with a mixture of ammonia, water and pyridine at room temperature or only slightly elevated temperature or allowed to stand with aqueous-methanolic sodium hydroxide solution at room temperature for a short period of time, e.g., up to a few hours. The residue $R_4$ or $R_5$ still present in this intermediate product can thereafter be split off by alkaline hydrolysis under more vigorous conditions or by hydrogenolysis, e.g., by allowing the product to stand for a longer period of time, e.g., several days, with aqueous-methanolic sodium hydroxide at room temperature, or by treatment with hydrogen and platinum oxide catalyst under normal pressure and at room temperature in an aqueous solution buffered to a pH of about 10–11 by the addition of alkaline-reacting salts.

If any functional groups in the starting compounds of Formula II are present in blocked form, any such groups which are sensitive to bases can be split off under the cyclizing conditions. For example, ester groups, e.g., carbalkoxy or acyloxy groups, can be saponified under the cyclization conditions, especially when the cyclizing reaction is effected with strong base.

Insofar as blocking groups are not split off already during the cyclization, they subsequently can be removed by hydrolysis or hydrogenolysis. Hydrolysis of blocking groups can suitably be effected in strongly alkaline media, e.g., by the action of alkali metal or alkaline earth metal hydroxides or quaternary ammonium hydroxides, under the conditions described above.

Any blocking groups ordinarily can be split off by hydrogenolysis under the above-mentioned conditions.

In the hydrolysis or hydrogenolysis reaction to remove a blocking group, it is advantageous to avoid acidic conditions, since the P—N bond is attacked in an acidic reaction medium. Therefore, the step is advantageously conducted in an alkaline medium, optionally in the presence of a buffer.

The novel compounds can be employed as drugs in the human or veterinary medicine in a mixture with solid, liquid and/or semi-liquid excipients. Suitable vehicles are those organic or inorganic substances suitable for parenteral, enteral, or topical application and which do not react with the novel compounds, such as, for example, water, vegetable oils, benzyl alcohols, polyethylene glycols, gelatin, lactose, amylose, magnesium stearate, talc, vaseline, cholesterol. Especially suitable for parenteral application are solutions, preferably oily or aqueous solutions, as well as suspensions, emulsions, or implants. Suitable for enteral application are tablets, dragees, capsules, syrups, elixirs, or suppositories, and for topical application salves, creams or powders. The above-mentioned preparations can optionally be sterilized or mixed with auxiliary agents, such as lubricants, preservatives, stabilizers, or wetting agents, emulsifiers, salts for influencing the osmotic pressure, buffers, coloring, flavoring and/or aromatous substances.

The substances are preferably administered in a dosage unit of from 0.5 to 100 mg. per dosage unit.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The temperatures in the examples set forth below are degrees centigrade.

The following preparation is typical for the preparation of the starting materials.

PREPARATION

One mmol of 5'-deoxy-5'-methylamino-adenosine is made anhydrous by repeated azeotropic distillation with dry pyridine, then dissolved in a mixture of 10 mol of dry pyridine and 0.84 ml triethylamine. With rapid stirring at −35°, 0,394 g of bis-(p-nitrophenyl)-phosphochloridate is added in portions. The reaction mixture is kept at 4° over night. One ml of 0.5 M sodium bicarbonate solution is added. The mixture is evaporated to dryness. After adding 25 ml of water, the residue is extracted several times with ethyl acetate. The extract is dried with anhydrous sodium sulfate and the solvent is evaporated. The thus obtained N-methyl-N-[5'-deoxy-adenyl(5')]-phosphoric acid bis-(p-nitrophenyl ester) amide is purified by preparative thin layer chromatography on silica plates using chloroform/methanol 85 : 15.

EXAMPLE 1

600 mg. of N-methyl-N-[5'-deoxy-adenyl-(5')]-phosphoric acid bis(p-nitrophenyl ester) amide (II, $R_1$ = adenine residue, $R_2$ = OH, $R_3$ = $CH_3$, $R_4$ = $R_5$ = p-nitrophenoxy; m.p. 184°; obtainable from 5'-deoxy-5'-methylamino-adenosine and bis(p-nitrophenyl) phosphochloridate) is dissolved in a mixture of 250 ml. of methanol and 50 ml. of 1N sodium hydroxide solution and allowed to stand for 7 days at room temperature. The reaction mixture is concentrated by evaporation under reduced pressure, the residue is dissolved in 20 ml. of methanol, and the thus-produced sodium salt of N-methyl-N-[5'-deoxy-adenyl-(3'-5')]-cyclophosphoric acid amide (I, $R_1$ = adenine residue, $R_2$ = OH, $R_3$ = $CH_3$) is precipitated with 400 ml. of acetone, and then washed with acetone. To obtain the substance in the pure form, the product is repeatedly precipitated from methanol/acetone; m.p. 228°.

It is also possible to conduct the reaction at high temperatures and correspondingly briefer reaction times (e.g., 3 hours at 50°); however, normally the compound is obtained in lower yields.

In place of using a mixture of methanol and solution of sodium hydroxide, it is also possible to employ a mixture of 60 ml. or pyridine, 100 ml. of 25 percent ammonia, and 40 ml. of water if, prior to the evaporation, 8 ml. of 1N sodium hydroxide solution is additionally introduced.

Furthermore, in place of the mixture of methanol and solution of sodium hydroxide, a mixture of 165 ml. of acetone and 35 ml. of 1N barium hydroxide solution can be utilized, in which case the corresponding barium salt is obtained.

Analogously, using the following starting compound:

N-methyl-N-[5'-deoxy-thyminyl-(5')]-phosphoric acid bis(p-nitrophenyl ester) amide (II, $R_1$ = thymine residue, $R_2$ = H, $R_3$ = $CH_3$, $R_4$ = $R_5$ = p-nitrophenoxy; m.p. 187°)

with methanolic-aqueous sodium hydroxide solution, the following product is obtained:

N-methyl-N-[5'-deoxy-thyminyl-(3'-5')]-cyclophosphoric acid amide (I, $R_1$ = thymine residue, $R_2$ = H, $R_3$ = $CH_3$); m.p. about 198°.

EXAMPLE 2 a. 420 mg. of N-methyl-N-[5'-deoxy-adenyl-(5')]-phosphoric acid bis(p-nitrophenyl ester) amide is allowed to stand in a mixture of 75 ml. of pyridine, 125 ml. of 25 percent strength ammonia, and 50 ml. of water for 2 hours at 40°. The reaction mixture is concentrated under reduced pressure, chromatographed on neutral silica gel with methanol/chloroform (15 : 85), and thus N-methyl-N-[5'-deoxy-adenyl-(3'-5')]-cyclophosphoric acid p-nitrophenyl ester amide is obtained (I, $R_1$ = adenine residue, $R_2$ = OH, $R_3$ = $CH_3$; p-nitrophenoxy in place of HO); m.p. 160°.

This compound can also be produced from the above-mentioned starting substance by allowing the latter to stand at RT for 2 hours in a mixture of 50 ml. of methanol and 50 ml. of 1N sodium hydroxide solution, concentrating thereafter at 5° under reduced pressure, and washing the raw product with water.

Analogously, with the starting compound
N-methyl-N-[5'-deoxy-thyminal-(5')]-phosphoric acid bis(p-nitrophenyl ester) amide using ammonia/water/pyridine, the following compound is produced:

N-methyl-N-[5'-deoxy-thyminyl-(3'-5')]-cyclophosphoric acid p-nitrophenyl ester amide, m.p. 251°.

b. One millimol of N-methyl-N-[5'-deoxy-adenyl-(3'-5')]-cyclophosphoric acid p-nitrophenyl ester amide is allowed to stand in a mixture of 50 ml. of methanol and 50 ml. of 1N sodium hydroxide solution for 7 days at room temperature. The mixture is worked up analogously to Example 1, thus obtaining the sodium salt of N-methyl-N-[5'-deoxy-adenyl-(3'-5')]-cyclophosphoric acid amide, m.p. 228°.

In an analogous manner, with the use of the following starting substance:

N-methyl-N-[5'-deoxy-thyminyl-(3'-5')]-cyclophosphoric acid p-nitrophenyl ester amide
the following product is obtained with methanolic-aqueous solution of sodium hydroxide:

N-methyl-N-[5'-deoxy-thyminyl-(3'-5'(]-cyclophosphoric acid amide.

EXAMPLE 3 a. 588 mg. of N-[5'-deoxy-adenyl-(5')]-phosphoric acid bis(p-nitrophenyl ester) amide (II, $R_1$ = adenine residue, $R_2$ = OH, $R_3$ = H, $R_4$ = $R_5$ = p-nitrophenoxy) is allowed to stand in a mixture of 60 ml. of pyridine, 150 ml. of 25 percent ammonia, and 30 ml. of water for 45 minutes at $-10°$. After concentration under reduced pressure, the N-[5'-deoxy-adenyl-(5')]-phosphoric acid (p-nitrophenyl ester) amide is separated by means of preparative layer chromatography on silica gel PSG $F_{254}$ (Merck) in the system 0.5 M triethylammonium bicarbonate/isopropanol (1 : 9), or on diethylaminoethyl cellulose (carbonate form) with the mobile phase gradients of water → 0.1 M triethylammonium bicarbonate. The product is not crystallized, but rather is directly further reacted after freeze-drying.

b. 467 mg. of N-[5'-deoxy-adenyl-(5')]-phosphoric acid (p-nitrophenyl ester) amide is dried by repeated evaporation with absolute pyridine, dissolved in 80 ml. of absolute dimethyl sulfoxide, and mixed dropwise at 15° with 12 ml. of 1 M potassium tert.-butylate solution in tert.-butanol. After 15 minutes, the reaction mixture is neutralized with a cation exchanger (Merck I, ammonium form); the exchanger is then filtered off, washed out with 1 percent strength ammonia solution, and the combined washing liquors are concentrated to a few milliliters. The solution is separated on a diethylaminoethyl cellulose column (carbonate form, Whatman DE 52) with a linear gradient of 0.005 M triethylammonium bicarbonate → 0.05 M triethylammonium bicarbonate. The third peak corresponds to N-[5'-deoxyadenyl-93'-5')]-cyclophosphoric acid amide (I, $R_1$ = adenine residue, $R_2$ = OH, $R_3$ = H). The zone is concentrated, then taken up in water, and freeze-dried. The substance is identified by its ultraviolet spectrum and chromatographic behavior.

EXAMPLE 4

100 mg. of N-benzyl-N-[5'-deoxy-adenyl-(5')]-phosphoric acid bis(p-nitrophenyl ester) amide (II, $R_1$ = adenine residue, $R_2$ = OH, $R_3$ = $C_6H_5CH_2$, $R_4$ = $R_5$ = p-nitrophenoxy; m.p. 130°; obtainable from 5'-benzylamino-5'-deoxy-adenosine) is dissolved in 20 ml. of methanol and, after the addition of 6 ml. of 1N NaOH, allowed to stand for 4 days at room temperature. After concentrating the mixture under reduced pressure, the residue is reprecipitated from methanol-/acetone, thus obtaining the sodium salt of N-benzyl-N-[5'-deoxy-adenyl-(3'-5')]-cyclophosphoric acid amide (I, $R_1$ = adenine residue, $R_2$= OH, $R_3$ = $C_6H_5CH_2$); m.p. 122°.

EXAMPLE 5 a. 100 mg. of N-benzyl-N-[5'-deoxy-adenyl-(5')]-phosphoric acid bis (p-nitrophenyl ester) amide is dissolved in 50 ml. of methanol and, after the addition of 50 ml. of ammonia, maintained at 40° for 2 hours. After concentrating under reduced pressure, N-benzyl-N-[5'-deoxy-adenyl-(3-5')]-cyclophosphoric acid p-nitrophenyl ester amide (I, $R_1$ = adenine residue, $R_2$ = OH, $R_3$ = $C_6H_5CH_2$, p-nitrophenoxy in place of HO) is isolated by chromatography on silica gel with ethyl acetate. The compound is reprecipitated in the system of methanol-benzene-cyclohexane; m.p. 134°.

This compound can also be obtained from the above-mentioned starting substance by allowing the latter to stand for 2 hours at room temperature in a mixture of 20 ml. of methanol and 1 ml. of 1N sodium hydroxide solution, bringing the reaction mixture to a pH of 8 with 1N acetic acid, extracting with ethyl acetate, purifying and reprecipitating as described above.

b. 100 mg. of N-benzyl-N-[5'-deoxy-adenyl-(3'-5')]-cyclophosphoric acid p-nitrophenyl ester amide is allowed to stand in a mixture of 20 ml. of methanol and 2 ml. of 1N solution of sodium hydroxide for 5 days at room temperature and then concentrated under reduced pressure. The thus-obtained sodium salt of N-benzyl-N-[5'-deoxy-adenyl-(3'-5')]-cyclophosphoric acid amide is reprecipitated from methanol/acetone; m.p. 122°.

EXAMPLE 6

Analogously to Example 1, with the use of the following starting substances:
N-cyclohexyl- or
N-n-octyl- or
N-(1-carbomethoxy-2-phenylethyl)-N-[5'-deoxy-adenyl-(5')]-phosphoric acid bis(p-nitrophenyl ester) amide, the sodium salts of the following amides are obtained with methanolic-aqueous sodium hydroxide solution:
N-cyclohexyl-N-[5'-deoxy-adenyl-(3'-5')]-cyclophosphoric acid amide;
N-n-octyl-N-[5'-deoxy-adenyl-(3'-5')]-cyclophosphoric acid amide;
N-(1-carbomethoxy-2-phenylethyl)-N-[5'-deoxy-adenyl-(3'-5')]-cyclophosphoric acid amide.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

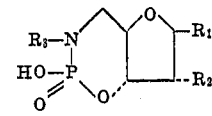

wherein $R_1$ is pyrimidyl or purinyl attached by the ring nitrogen atom thereof at position 1 and 9, respectively, or a corresponding group substituted by at least one of halo, hydroxy, lower-alkyl, $-NH_2$, $-NH$-lower-alkyl and $-N$(lower-alkyl)$_2$; $R_2$ is H, OH, alkoxy of one to 12 carbon atoms, or OH esterified with fatty acid of one to 18 carbon atoms, an alkylsulfonic acid of one to six carbon atoms, or an arylsulfonic acid of six to 10 carbon atoms; and $R_3$ is H or a hydrocarbon selected from the group consisting of alkyl, aryl, cycloalkyl, arylalkyl and cycloalkyl of up to ten carbon atoms, or a corresponding group substituted by hydroxy, alkoxy of one to four carbon atoms, amino, mercapto, alkylmercapto of one to four carbon atoms, carboxy carb-lower-alkoxy, guanidino, 3-indolyl or 4-imidazolyl; and the physiologically acceptable inorganic salts thereof.

2. A compound of claim 1 wherein $R_1$ is adenyl.
3. A compound of claim 1 wherein $R_1$ is thyminyl.
4. A compound of claim 1 wherein $R_2$ is H or OH.
5. A compound of claim 1 wherein $R_3$ is H or lower-alkyl.
6. A compound of claim 1 wherein $R_3$ is methyl.
7. A compound of claim 2 wherein $R_2$ is H or OH and $R_3$ is H or lower-alkyl.
8. A compound of claim 3 wherein $R_2$ is H or OH and $R_3$ is lower-alkyl.
9. A compound of claim 1 in physiologically acceptable salt form.
10. The sodium salt of a compound of claim 1.
11. A compound of claim 1, N-methyl-N-[5'-deoxy-adenyl-(3'-5')]-cyclophosphoric acid amide or the sodium salt thereof.
12. A compound of claim 1, N-methyl-N-[5'-deoxy-thyminyl-(3'-5')]-cyclophosphoric acid amide or the sodium salt thereof.
13. A process for the preparation of the compounds of claim 1 which comprises cyclizing, with an alkali-metal or alkaline earth hydroxide, and alkali-metal carbonate or alcoholate or a strongly alkaline organic base, a compound of the formula

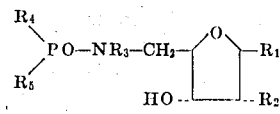

wherein $R_1$ is pyrimidyl or purinyl attached by the ring nitrogen atom thereof at position 1 and 9, respectively, or a corresponding group substituted by at least one of halo, hydroxy, lower-alkyl, —$NH_2$, —NH-lower-alkyl and —N(lower-alkyl)$_2$; $R_2$ is H, OH, alkoxy of one to 12 carbon atoms, or OH esterified with fatty acid of one to 18 carbon atoms, an alkylsulfonic acid of one to six carbon atoms, or an arylsulfonic acid of six to 10 carbon atoms; and $R_3$ is H or a hydrocarbon selected from the group consisting of alkyl, aryl, cycloalkyl, arylalkyl and cycloalkyl of up to ten carbon atoms, or a corresponding group substituted by hydroxy, alkoxy of one to four carbon atoms, amino, mercapto, alkylmercapto of one to four carbon atoms, carboxy carb-lower-alkoxy, guanidino, 3-indolyl or 4-imidazolyl; and $R_4$ and $R_5$ each are carbocyclic aryloxy, or a salt thereof.

14. A process according to claim 13 wherein the cyclization is conducted in an aqueous solvent.
15. A process according to claim 13 wherein the cyclization is conducted at between 15° and 50° C.

* * * * *